US012759365B2

(12) United States Patent
Pournazeri et al.

(10) Patent No.: US 12,759,365 B2
(45) Date of Patent: Oct. 13, 2026

(54) COORDINATION BETWEEN ACTIVE DOWNFORCE AND ACTIVE SUSPENSION CONTROLS FOR MAXIMIZED TIRE GRIP FOR A VEHICLE

(71) Applicant: GM GLOBAL TECHNOLOGY OPERATIONS LLC, Detroit, MI (US)

(72) Inventors: Mohammad Pournazeri, Etobicoke (CA); Mustafa Hakan Turhan, Kitchener (CA); Arash Hashemi, Waterloo (CA); Naser Mehrabi, Richmond Hill (CA); Juchirl Park, Troy, MI (US); SeyedAlireza Kasaiezadeh Mahabadi, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 106 days.

(21) Appl. No.: 18/776,889

(22) Filed: Jul. 18, 2024

(65) Prior Publication Data

US 2026/0021686 A1 Jan. 22, 2026

(51) Int. Cl.

| | |
|---|---|
| ***G07C 5/00*** | (2006.01) |
| ***B60G 17/016*** | (2006.01) |
| ***B60G 17/0195*** | (2006.01) |
| ***G07C 5/02*** | (2006.01) |
| ***G07C 5/04*** | (2006.01) |
| ***G07C 5/08*** | (2006.01) |

(52) U.S. Cl.

CPC ....... *B60G 17/0195* (2013.01); *B60G 17/016* (2013.01); *B60G 2400/252* (2013.01); *B60G 2500/30* (2013.01)

(58) Field of Classification Search

CPC .............. B60G 17/0195; B60G 17/016; B60G 2400/252; B60G 2500/30

See application file for complete search history.

(56) References Cited

U.S. PATENT DOCUMENTS

| | | | | |
|---|---|---|---|---|
| 10,315,711 | B2 | 6/2019 | Demetrio et al. | |
| 11,485,429 | B2 * | 11/2022 | Yen ........................ | B62D 35/00 |
| 12,115,996 | B2 | 10/2024 | Nahidi et al. | |

(Continued)

FOREIGN PATENT DOCUMENTS

| | | | |
|---|---|---|---|
| DE | 102010026432 | A1 | 1/2012 |
| DE | 102019117228 | A1 | 12/2020 |

OTHER PUBLICATIONS

German Office Action for German Application No. 102024126095.5; dated May 9, 2025; 7 pages.

*Primary Examiner* — Kito R Robinson
*Assistant Examiner* — Anthony Gabriel Mora
(74) *Attorney, Agent, or Firm* — CANTOR COLBURN LLP

(57) ABSTRACT

Examples described herein provide a method for coordination between active downforce and active suspension controls for a vehicle that includes determining an optimal ride height for the vehicle based on current conditions of the vehicle. The method further includes determining a suspension actuator force to implement the optimal ride height for the vehicle. The method further includes controlling, by an active suspension system of the vehicle, an actuator using the suspension actuator force to achieve the optimal ride height for the vehicle.

20 Claims, 7 Drawing Sheets

(56) References Cited

U.S. PATENT DOCUMENTS

| | | | | |
|---|---|---|---|---|
| 2014/0195113 | A1* | 7/2014 | Lu | B60G 17/0165 701/37 |
| 2015/0149046 | A1* | 5/2015 | Jeong | B62D 35/007 701/49 |
| 2017/0080770 | A1* | 3/2017 | Irwin | B62D 35/00 |
| 2017/0088192 | A1* | 3/2017 | Auden | B62D 35/007 |
| 2019/0092403 | A1* | 3/2019 | Bray | F15D 1/10 |
| 2019/0161089 | A1* | 5/2019 | Fahland | B60W 10/22 |
| 2020/0249356 | A1* | 8/2020 | Huang | G05D 1/0231 |
| 2022/0281456 | A1* | 9/2022 | Giovanardi | G08G 1/0112 |
| 2022/0363322 | A1* | 11/2022 | Allmandinger | G01C 21/20 |
| 2023/0213081 | A1* | 7/2023 | Michener | B60G 13/08 188/266.1 |
| 2023/0415537 | A1* | 12/2023 | Jing | B60G 17/0182 |
| 2024/0132053 | A1* | 4/2024 | De Pinto | B60G 17/0162 |
| 2024/0253412 | A1 | 8/2024 | Akai et al. | |
| 2024/0317008 | A1* | 9/2024 | Giovanardi | B60G 17/016 |

* cited by examiner

COORDINATION BETWEEN ACTIVE DOWNFORCE AND ACTIVE SUSPENSION CONTROLS FOR MAXIMIZED TIRE GRIP FOR A VEHICLE

The subject disclosure relates to vehicles, and in particular to coordination between active downforce and active suspension controls for maximized tire grip for a vehicle.

Modern vehicles (e.g., a car, a motorcycle, a boat, or any other type of automobile) may be equipped with various systems for improving handling, stability, and overall performance of the vehicle. For example, a vehicle may include an active downforce system that provides for dynamically adjusting aerodynamic elements/surfaces (e.g., gurney flaps, rear wings, and/or the like, including combinations and/or multiples thereof) of the vehicle to increase downward force exerted on a vehicle to improve tire grip for the vehicle. As another example, a vehicle may include an active suspension system to control forces between wheels of a vehicle and the body of the vehicle to provide ride comfort.

SUMMARY

In one embodiment, a method for coordination between active downforce and active suspension controls for a vehicle is provided. The method includes determining an optimal ride height for the vehicle based on current conditions of the vehicle. The method further includes determining a suspension actuator force to implement the optimal ride height for the vehicle. The method further includes controlling, by an active suspension system of the vehicle, an actuator using the suspension actuator force to achieve the optimal ride height for the vehicle.

In addition to one or more of the features described herein, or as an alternative, further embodiments of the method may include that the optimal ride height comprises a front ride height of the vehicle and a rear ride height of the vehicle.

In addition to one or more of the features described herein, or as an alternative, further embodiments of the method may include that the optimal ride height is determined using a ride height optimizer engine.

In addition to one or more of the features described herein, or as an alternative, further embodiments of the method may include that the ride height optimizer engine comprises aerodynamic maps and a neural network.

In addition to one or more of the features described herein, or as an alternative, further embodiments of the method may include that the neural network is a shallow fully connected neural network.

In addition to one or more of the features described herein, or as an alternative, further embodiments of the method may include that the neural network converts the aerodynamic maps to a non-linear state space model.

In addition to one or more of the features described herein, or as an alternative, further embodiments of the method may include that determining the optimal ride height is based at least in part on a specific aerodynamic position of an adjustable aerodynamic surface of the vehicle and a longitudinal velocity of the vehicle.

In addition to one or more of the features described herein, or as an alternative, further embodiments of the method may include that the suspension actuator force is determined using a model predictive control engine.

In addition to one or more of the features described herein, or as an alternative, further embodiments of the method may include that the model predictive control engine comprises an aerodynamic model of the vehicle and a suspension model of a suspension system of the vehicle.

In addition to one or more of the features described herein, or as an alternative, further embodiments of the method may include that the model predictive control engine comprises a suspension prediction model generated by converting a nonlinear neural network to a linear suspension model and combining the linear suspension model with a half-car model.

In another embodiment, a vehicle is provided. The vehicle includes an active downforce system for controlling an adjustable aerodynamic surface of the vehicle. The vehicle further includes an active suspension system for controlling an actuator, the actuator adjusting a ride height of the vehicle. The vehicle further includes a processing system communicatively coupled to the active downforce system and the active suspension system. The processing system includes a memory having computer readable instructions a processing device for executing the computer readable instructions, the computer readable instructions controlling the processing device to perform operations for coordination between active downforce and active suspension controls for the vehicle. The operations include determining an optimal ride height for the vehicle based on current conditions of the vehicle. The operations further include determining a suspension actuator force to implement the optimal ride height for the vehicle. The operations further include causing the active suspension system of the vehicle to control the actuator using the suspension actuator force to achieve the optimal ride height for the vehicle.

In addition to one or more of the features described herein, or as an alternative, further embodiments of the vehicle may include that the optimal ride height comprises a front ride height of the vehicle and a rear ride height of the vehicle.

In addition to one or more of the features described herein, or as an alternative, further embodiments of the vehicle may include that the optimal ride height is determined using a ride height optimizer engine.

In addition to one or more of the features described herein, or as an alternative, further embodiments of the vehicle may include that the ride height optimizer engine comprises a neural network that converts aerodynamic maps to a non-linear state space model.

In addition to one or more of the features described herein, or as an alternative, further embodiments of the vehicle may include that determining the optimal ride height is based at least in part on a specific aerodynamic position of the adjustable aerodynamic surface of the vehicle and a longitudinal velocity of the vehicle.

In another embodiment a computer program product is provided. The computer program product includes a computer readable storage medium having program instructions embodied therewith, the program instructions executable by at least one processor to cause the at least one processor to perform operations. The operations include determining an optimal ride height for a vehicle based on current conditions of the vehicle. The operations further include determining a suspension actuator force to implement the optimal ride height for the vehicle. The operations further include controlling, by an active suspension system of the vehicle, an actuator using the suspension actuator force to achieve the optimal ride height for the vehicle.

In addition to one or more of the features described herein, or as an alternative, further embodiments of the computer program product may include that the optimal ride height comprises a front ride height of the vehicle and a rear ride height of the vehicle.

In addition to one or more of the features described herein, or as an alternative, further embodiments of the computer program product may include that the optimal ride height is determined using a ride height optimizer engine.

In addition to one or more of the features described herein, or as an alternative, further embodiments of the computer program product may include that the ride height optimizer engine comprises a neural network that converts aerodynamic maps to a non-linear state space model.

In addition to one or more of the features described herein, or as an alternative, further embodiments of the computer program product may include that determining the optimal ride height is based at least in part on a specific aerodynamic position of an adjustable aerodynamic surface of the vehicle and a longitudinal velocity of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
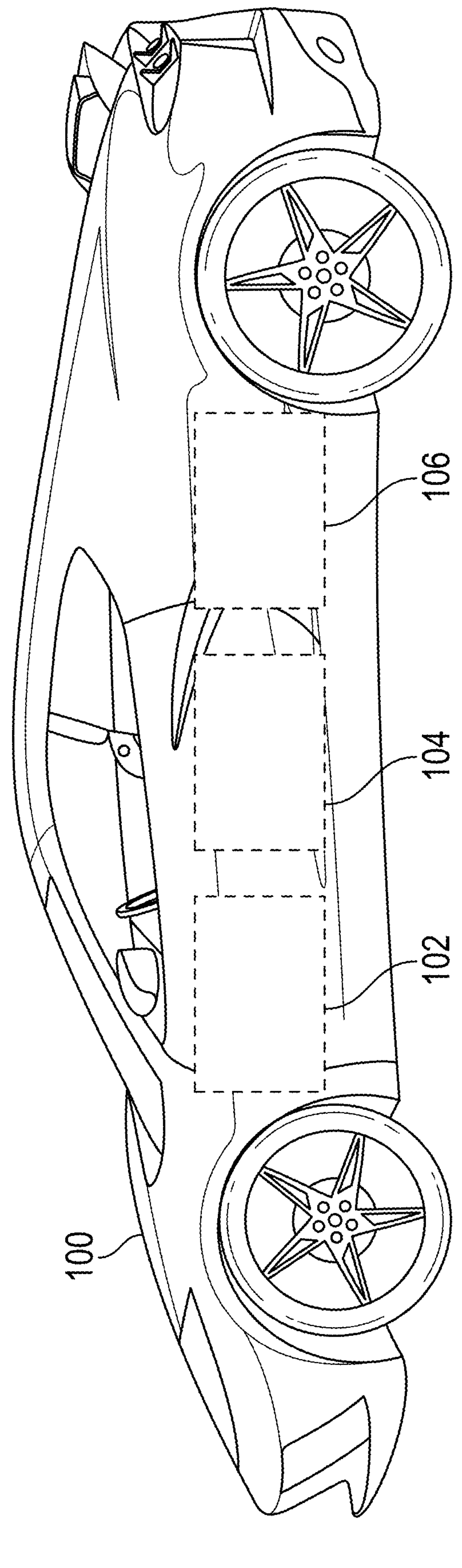
FIG. 1 is an illustration of a vehicle having a processing system that provides coordination between an active downforce system and an active suspension system according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In vehicles, various systems may be used for improving handling, stability, and overall performance of the vehicle. For example, a vehicle may include an active downforce system, an active suspension system, and/or the like, including combinations and/or multiples thereof. Often, active downforce systems and active suspension systems operate independently and without coordination. Ride height of a vehicle, which is primarily controlled by the active suspension system, can influence downforces on a vehicle. For example, when front and/or rear ride heights change, aerodynamic properties (e.g., angle of attack) of the vehicle also change. As another example, a maximum achievable downforce at each axle is limited by front and rear ride heights. Consider the following: the downforce at the front axle depends on front ride height and rear ride height since the majority of downforce is created by the underbody of the vehicle. During maneuvers like corner-exit, the front end of the vehicle moves away from ground due to load transfer. In this case, the front downforce is reduced significantly.

One or more embodiments described herein relates to coordination between active downforce and active suspension controls for maximized tire grip for a vehicle. For example, one or more embodiments described herein cause the active suspension system to create some forces so that ride height at the front and rear of the vehicle are adjusted to achieve maximum downforce for the current condition of the vehicle.

According to one or more embodiments, a control framework is provided that optimizes the performance of vehicles equipped with active downforce systems and active suspension systems (e.g. fully active, height control systems, etc.). By adjusting the vehicle's ride height (which also adjusts angle of attack) using the active suspension system, optimal ride heights can be achieved to maximize aerodynamic forces and improve tire grip. According to one or more embodiments, an interface mechanism is provided that determines the ideal ride heights at the front and rear axles of the vehicle and suggests suspension forces that provide for achieving the ideal ride heights. One or more embodiments takes into account the impact of suspension on tire capacity, ensuring a comprehensive calculation of the suggested suspension forces. This integrated approach aims to enhance vehicle stability, handling, and overall performance.

According to one or more embodiments, during highly dynamic maneuvers, such as corner exits, the changing body height and angle of attack (ride heights) of a vehicle can significantly impact the production of downforce by the aerodynamic elements. This degradation in aerodynamic downforce production can affect the vehicle's stability, performance, and consistency.

According to one or more embodiments, vehicles equipped with multiple active systems, such as active suspension and active aerodynamics (e.g., active downforce), may face conflicts in their control algorithms objectives. Each system has its own priorities and objectives. For instance, the active suspension system may aim to enhance ride comfort, while the active downforce system focuses on providing the necessary grip to maintain vehicle stability.

Resolving these conflicts and ensuring harmonious operation of these systems is desired for optimal vehicle performance.

One or more embodiments described herein provide fully integrated solution by modifying existing active downforce and active suspension systems and their associated control algorithms. An independent coordination approach that coordinates between active downforce and active suspension systems can avoid significant changes to any of the current control algorithms and at the same time maintain modularity of the software.

FIG. 1 is an illustration of a vehicle 100 having a processing system 102 that provides coordination between an active downforce system 104 and an active suspension system 106 according to one or more embodiments. The vehicle 100 can be a car, a truck, a van, a bus, a motorcycle, a boat, or any other type of automobile. According to an embodiment, the vehicle 100 includes an internal combustion engine fueled by gasoline, diesel, or the like. According to another embodiment, the vehicle 100 is a hybrid electric vehicle partially or wholly powered by electrical power. According to another embodiment, the vehicle 100 is an electric vehicle powered by electrical power. According to one or more embodiments, the vehicle 100 is an autonomous or semi-autonomous vehicle. An autonomous vehicle is a vehicle that has self-driving capabilities. A semi-autonomous vehicle is a vehicle that has certain autonomous features (e.g., self-parking, lane keeping, etc.) but lacks full autonomous control.

Figure 2:
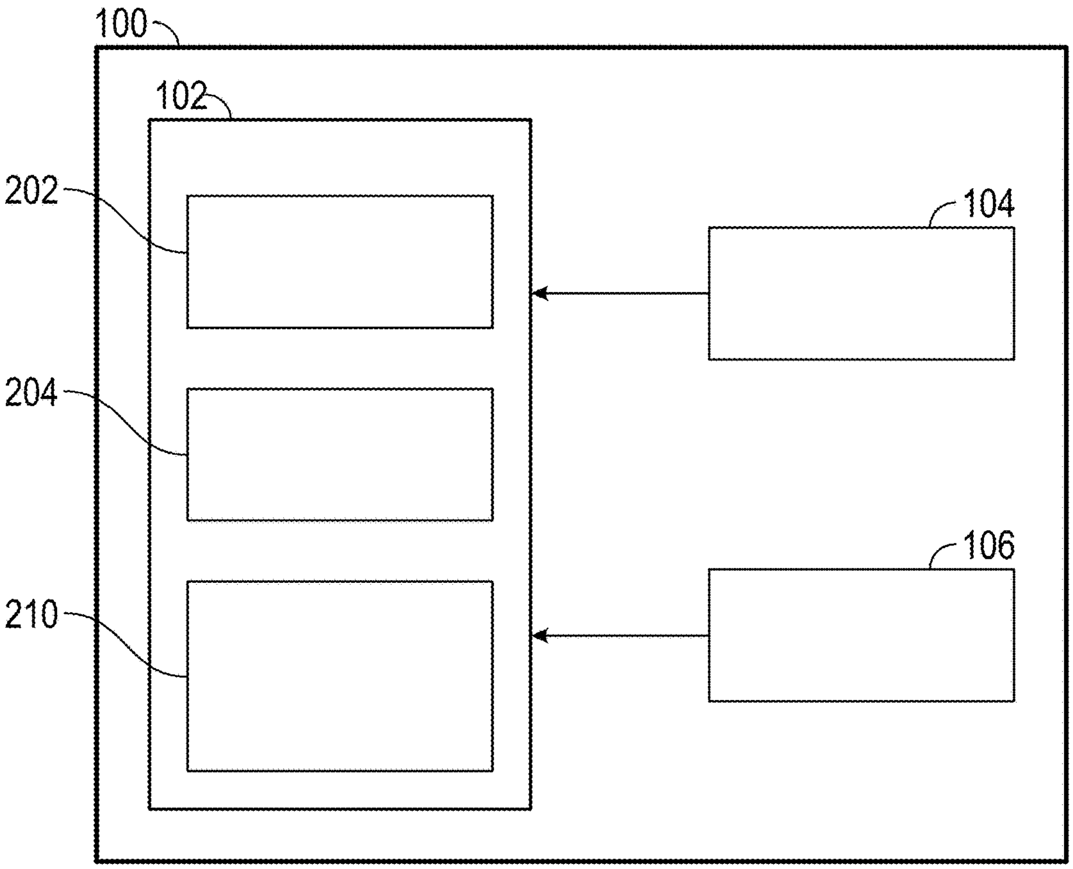
FIG. 2 is a block diagram of the processing system of FIG. 1 for coordination between the active downforce system and the active suspension system according to one or more embodiments.

According to one or more embodiments, the vehicle 100 includes the processing system 102, which is shown in more detail in FIG. 2, described herein. The vehicle 100 also includes the active downforce system 104 and the active suspension system 106. The active downforce system 104 provides for dynamically adjusting aerodynamic elements/surfaces of the vehicle 100 to increase downward force exerted on the vehicle to improve tire grip for the vehicle. The active suspension system 106 provides for automatically adjusting suspension settings of the vehicle 100 to maintain optimal contact between tires of the vehicle and a road surface to provide improved ride and handling characteristics.

Further features of the processing system 102 are now described with reference to FIGS. 2-10.

Particularly, FIG. 2 is a block diagram of the processing system of 102 for coordination between the active downforce system 104 and the active suspension system 106 according to one or more embodiments. The processing system 102 includes a processing device 202, a memory 204, and a downforce and suspension coordination engine 210. It should be appreciated that the processing system 102 can be any device suitable for providing coordination between active downforce and active suspension controls for maximized tire grip for a vehicle. For example, the processing system 102 can be a device implemented in or otherwise associated with the vehicle 100. As another example, the processing system 102 can be a smartphone, tablet computer, laptop computer, desktop computer, wearable computing device, and/or the like, including combinations and/or multiples thereof.

The processing device 202 is any suitable processing circuitry for processing data and/or instructions. The processing device 202 is an example of one or more of the processing devices 1021 of FIG. 10, as described in more detail herein.

The memory 204 is any suitable device for storing data and/or instructions. The memory 204 is an example of one or more of the system memory 1022, the random access memory 1023, and/or the read-only memory 1024 of FIG. 10, as described in more detail herein.

The downforce and suspension coordination engine 210 coordinates between the active downforce system 104 and the active suspension system 106, as described in more detail herein.

Further aspects and features of the downforce and suspension coordination engine 210 are described herein with respect to FIGS. 3-9.

The various components, modules, engines, etc. described regarding FIG. 2 (e.g., the downforce and suspension coordination engine 210) can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 202 for executing those instructions. Thus, a system memory (e.g., memory 204) can store program instructions that, when executed by the processing device 202, implement the engines described herein. Other engines can also be utilized to include other features and functionality described in other examples herein.

Figure 3:
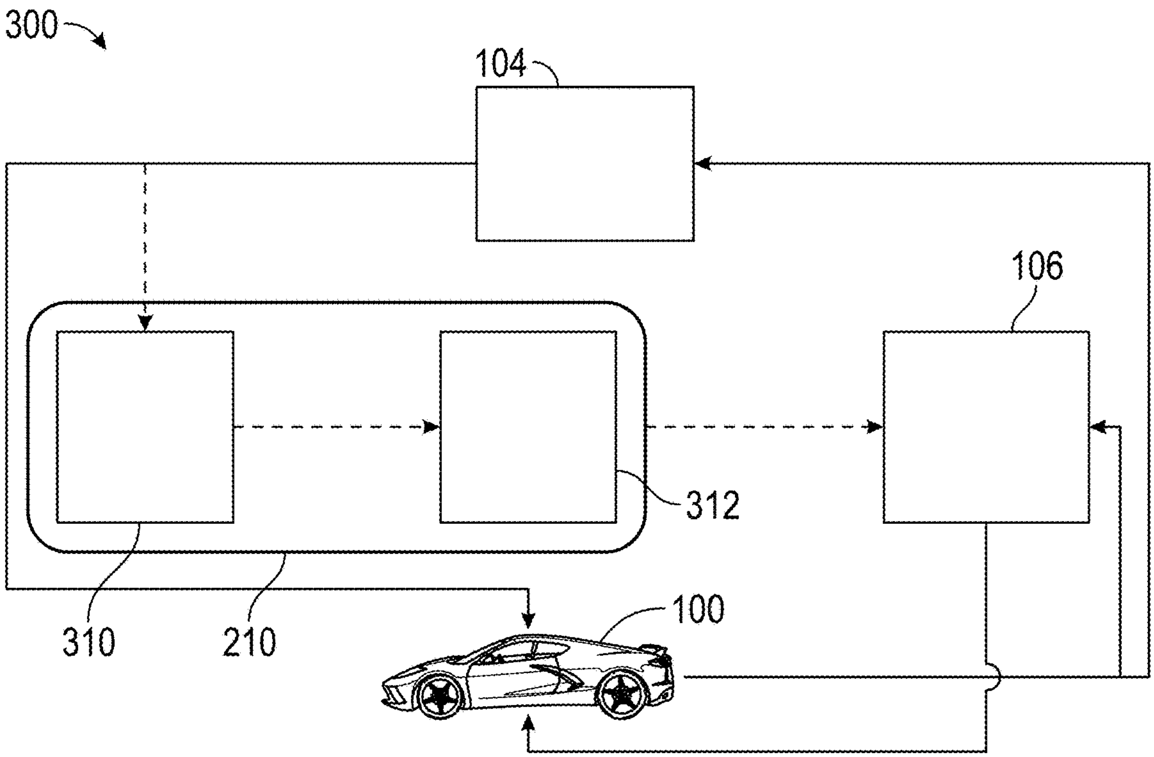
FIG. 3 is a block diagram of an architecture for providing coordination between the active downforce system and the active suspension system for the vehicle of FIG. 1 according to one or more embodiments.

Turning now to FIG. 3, an architecture 300 for providing coordination between the active downforce system 104 and the active suspension system 106 for the vehicle 100 is provided, according to one or more embodiments. The architecture 300 provides for determining a desired ride height to achieve maximized front and/or rear downforces and then provides for determining optimal suspension actuator forces to achieve the desired ride height.

In FIG. 3, the vehicle 100 generates estimations for suspension actuator forces and transmits the estimations to the active downforce system 104 and the active suspension system 106 as shown. The active downforce system 104 generates position commands for positioning aerodynamic elements/surfaces of the vehicle 100, which are sent to the vehicle. The position commands are also sent to the downforce and suspension coordination engine 210, which includes a ride height optimizer engine 310 and a model predictive control engine 312. The ride height optimizer engine 310 uses an actuator model to generate a desired ride height (e.g., a front ride height and/or a rear ride height), which is sent to the model predictive control engine 312. The model predictive control engine 312 uses a half car model plus a downforce actuator model to generate recommended suspension actuator forces that are then sent to the active suspension system 106 and back to the vehicle 100 as shown. The downforce actuator model includes aero maps (e.g., lookup tables) that are obtained through wind tunnel testing. The lookup table model cannot be used in optimization or in model predictive control (MPC) prediction model. Therefore, this lookup table model is converted into a neural network with a mathematical representation. This non-linear mathematical representation is directly used in the optimization, is linearized, and is combined with the half car model in the MPC prediction model. It should be appreciated that commands/signals described as being sent by the active downforce system 104 and/or the active suspension system 106 to the vehicle 100 are commands/ signals sent to other systems, controllers, devices, components, and/or the like, including combinations and/or multiples thereof, of the vehicle 100.

According to one or more embodiments, the model predictive control engine 312 can successfully track target pitch and heave of the vehicle 100 as a result of the optimal ride heights. Active downforce and suspension coordination provides an overall increase in tire grip forces. For example, as shown in the following Table of example results, tire grip with coordination exceeds tire grip without coordination for both front and rear:

| | $\sqrt{\text{sum(Tire Grip (N)}^2)}$ without coordination | sum(Tire Grip $(N)^2$) with coordination |
|---|---|---|
| Front | 792,690 | 818,810 |
| Rear | 1,326,000 | 1,339,200 |

It is evident that active downforce and suspension coordination provides an overall increase in the tire grip forces and downforces. For example, in one test, the front of the vehicle 100 experienced a substantially 17% increase in added grip compared to no downforce between active downforce and active suspension while the rear of the vehicle 100 experienced a substantially 5% increase in added grip compared to no downforce between active downforce and active suspension.

Figure 4:
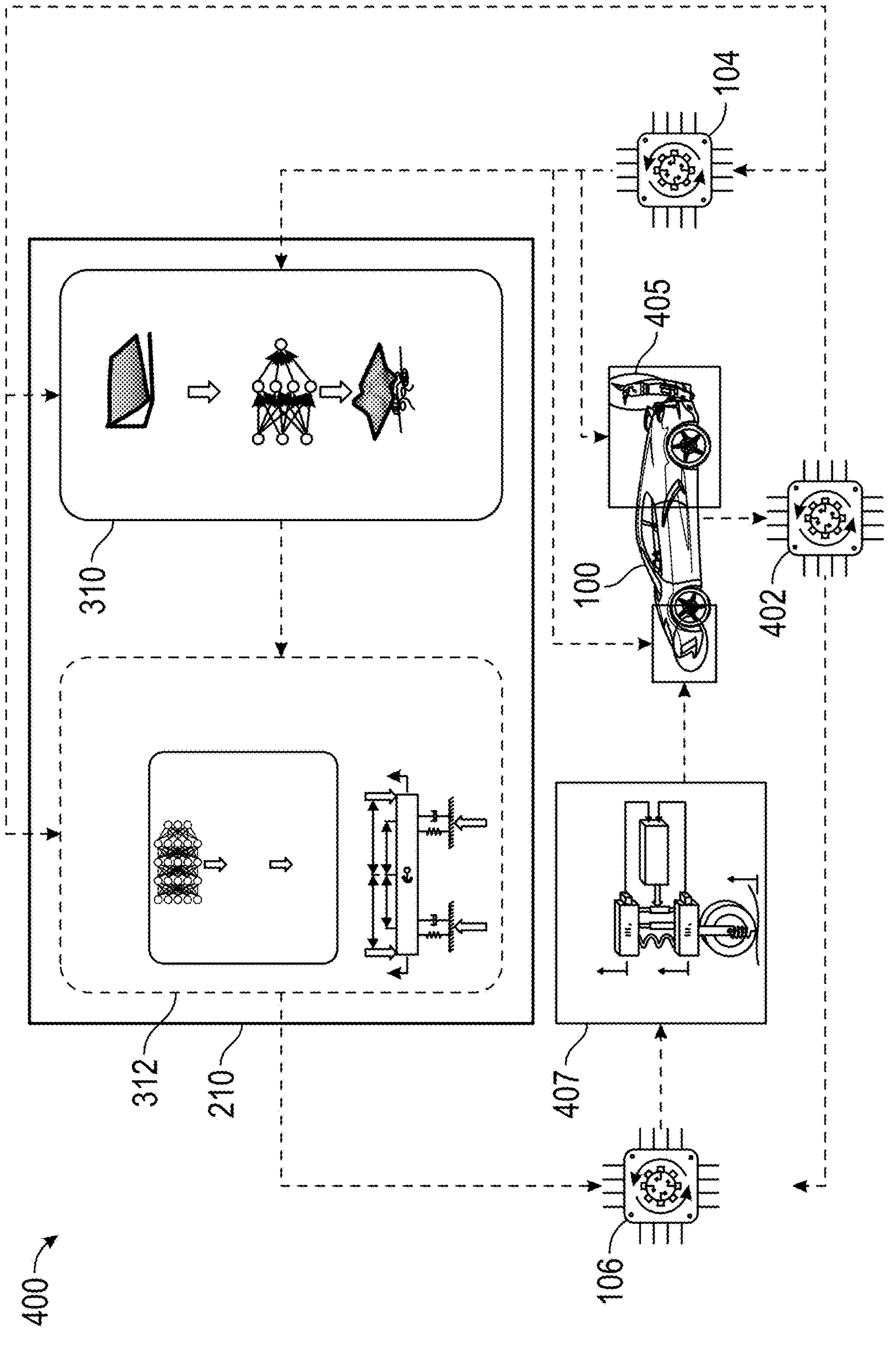
FIG. 4 is a block diagram of an architecture for providing coordination between the active downforce system and the active suspension system for the vehicle of FIG. 1 according to one or more embodiments.

FIG. 4 depicts a block diagram of an architecture 400 for providing coordination between the active downforce system 104 and the active suspension system 106 for the vehicle 100 is provided, according to one or more embodiments. The architecture 400 shows further features and functions of the architecture 300 of FIG. 3.

As in FIG. 3, the architecture 400 of FIG. 4 includes the active downforce system 104 and the active suspension system 106 for the vehicle 100. In this example, the architecture 400 includes a vehicle dynamics estimator 402 to generate vehicle measurements and estimations (e.g., estimations for suspension actuator forces). The vehicle measurements and estimations are sent from the vehicle dynamics estimator 402 to the active downforce system 104 and the active suspension system 106.

As shown in FIG. 4, the active downforce system 104 controls one or more aerodynamic elements/surfaces 405, which may be connected to and/or integrated into the vehicle 100. The active suspension system 106 controls one or more actuators 407 (and/or other components), which may be connected to and/or integrated into the vehicle 100.

Also as in FIG. 3, the architecture of FIG. 4 includes the downforce and suspension coordination engine 210, which includes the ride height optimizer engine 310 and the model predictive control engine 312. The active downforce system 104 feeds a current position request into the ride height optimizer engine 310, which determines an optimal ride height. The optimal ride height is the ride height for the vehicle 100 that causes a desired downforce for the vehicle 100 to be realized. The optimal ride height is fed into the model predictive control engine 312, which generates a suspension actuator force (also referred to as an active suspension force) request that is fed into the active suspension system 106.

The ride height optimizer engine 310 uses aerodynamic maps ("aero maps") in the form of a neural network to determine the optimal ride height. The aero maps are developed during wind tunnel testing for the vehicle 100. Typically, the aero maps cannot be used directly for control, so the neural network is used to convert the aero maps into a usable form (e.g., convert look up tables to neural network for predictive control). The neural network can be any suitable network architecture, such as a shallow fully connected neural network. The ride height optimizer engine 310 provides for maximizing aerodynamic downforces for the vehicle 100 while maintaining vehicle balance.

The model predictive control engine 312 determines or calculates suspension actuator force that is sent to the active suspension system 106. This ensures the vehicle 100 is positioned (in terms of ride height/angle of attack) correctly to achieve the desired downforces. The model predictive control engine 312 includes an aerodynamic model ("aero model") for the vehicle 100 and a suspension model for a suspension system (e.g., the one or more actuators 407) the vehicle 100.

The downforce and suspension coordination engine 210 improves vehicle dynamics during cornering maneuvers (e.g., tire capacity, yaw control, and lateral velocity control), improves braking, improves vehicle pitch control to maintain vehicle balance, and reduces drag when downforce is not needed (e.g., in straight line driving situations) to maximize vehicle speed. Features and functionality of the downforce and suspension coordination engine 210, including the ride height optimizer engine 310 and the model predictive control engine 312, are described in more detail with reference to FIGS. 5-7.

Figure 5:
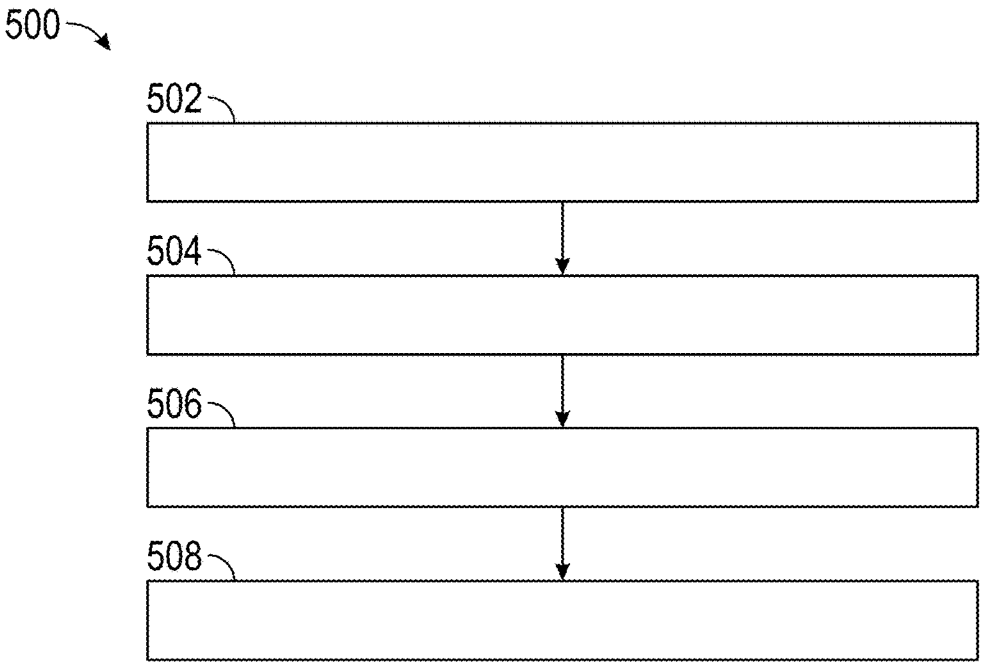
FIG. 5 is a flow diagram of a method for coordination between active downforce and active suspension controls for a vehicle according to one or more embodiments.

FIG. 5 depicts a flow diagram of a method 500 for coordination between active downforce and active suspension controls for a vehicle according to one or more embodiments. The method 500 can be implemented by any suitable system or device, such as the processing system 102 (e.g., using the downforce and suspension coordination engine 210), the processing system 1000 of FIG. 10, and/or the like, including combinations and/or multiples thereof. The method 500 is now described with reference to one or more of FIGS. 1-4 but is not so limited.

At block 502, the downforce and suspension coordination engine 210 converts aerodynamic maps into a neural network (or multiple neural networks). In particular, aero maps are converted into neural network alternatives, which enables replacing look up tables with analytical formulations for the aero maps. The aero maps can determine front and rear downforces from a look up table developed during wind tunnel testing for the vehicle 100 as follows:

Front Downforce = Lookup (ride heights, air speed, act positions)

Rear Downforce = Lookup (ride heights, air speed, act positions).

To convert the aero maps (which take the form of an actuator model referred to as an aero maps actuator model) to a linear state space model, a neural network is designed and trained to fit the aero maps actuator models. Then, the neural network model is converted to a non-linear state space model using the following equation:

$$X_{k+1} = \mathcal{F}(X_k, U_k, D_{m,k}),$$

where x is front and rear downforces, $D_{m.k}$ is velocity and ride height, U is an actuator command, and k is time. This equation can be expanded as follows:

$$X_{k+1} = \mathcal{F}(X_k, U_k, D_{m,k}) = W_{31}\sigma(W_{21}\tanh(W_{11}D_{m,k} + W_{12}U_k + W_{13}X_k + B_1) + B_2) + B_3$$

where W is a weight value and B is a bias value.

With continued reference to FIG. 5, at block 504, the downforce and suspension coordination engine 210 designs the ride height optimizer engine 310 to obtain the optimal ride height that maximizes downforce given a specific aerodynamic position of one or more adjustable aerodynamic elements/surfaces of the vehicle 100 and longitudinal velocity for the vehicle 100. In particular, at block 504, the optimal ride heights are determined for given commands and for given vehicle velocity to maximize downforce created at each wing of the vehicle 100 while making sure that the ratio of the maximized downforces is within an acceptable range that does not affect vehicle balance (or at least maintains vehicle balance within an acceptable range).

Using a neural network mathematical correlation, the front and rear downforces can be written as a function of the front and rear ride heights as follows:

$$\begin{bmatrix} F_{df,frnt}(RH_{frnt}, RH_{rear}) \\ F_{df,rear}(RH_{frnt}, RH_{rear}) \end{bmatrix} = W_{31}\sigma\left(W_{21}\tanh\left(W_{11}\begin{bmatrix} V_x \\ RH_{frnt} \\ RH_{rear} \end{bmatrix} + W_{12}\begin{bmatrix} \text{cmd}_{frnt} \\ \text{cmd}_{rear} \end{bmatrix} + B_1\right) + B_2\right) + B_3$$

where $F_{f,frnt}$ is a front down force, $F_{df,rear}$ is a rear down force, $RH_{frnt}$ is a front ride height, $RH_{rear}$ is a rear ride height, $\text{cmd}_{frnt}$ is a front suspension command, $\text{cmd}_{rear}$ is a rear suspension command, and σ is a sigmoid activation function. It should be appreciated that any suitable activation function, such as sigmoid, rectified linear unit (ReLU), hyperbolic tangent (tanh), and/or the like, including combinations and/or multiples thereof, can be used.

According to one or more embodiments, an interior-point nonlinear optimization technique is used to maximize the front downforce ($F_{df,frnt}$) and the rear downforce ($F_{df,rear}$). For example, a gradient-based approach is design to work on problems where the objective and constraint functions are both continuous and have continuous first derivatives. In this maximization problem, the constraint is to make sure that with the maximized downforces (e.g., $F_{df,rear,opt}$ and $F_{df,frnt,opt}$), the aerodynamic bias is not affected beyond a desirable limit, which is expressed as follows:

$$AD \text{ commanded aero bias} - \varepsilon \leq \frac{F_{df,frnt,opt}}{F_{df,rear,opt} + F_{df,frnt,opt}} \leq AD \text{ commanded aero bias} + \varepsilon$$

where ε is a selectable constant, which can be a percentage of force, an amount of force, and/or the like, including combinations and/or multiples thereof.

With continued reference to FIG. 5, at block 506, the downforce and suspension coordination engine 210 obtains a computationally efficient suspension prediction model suitable for model-based control. This includes converting a nonlinear neural network to a linear suspension model, which is then integrated with a half-car model to develop a final suspension prediction model.

Figure 6:
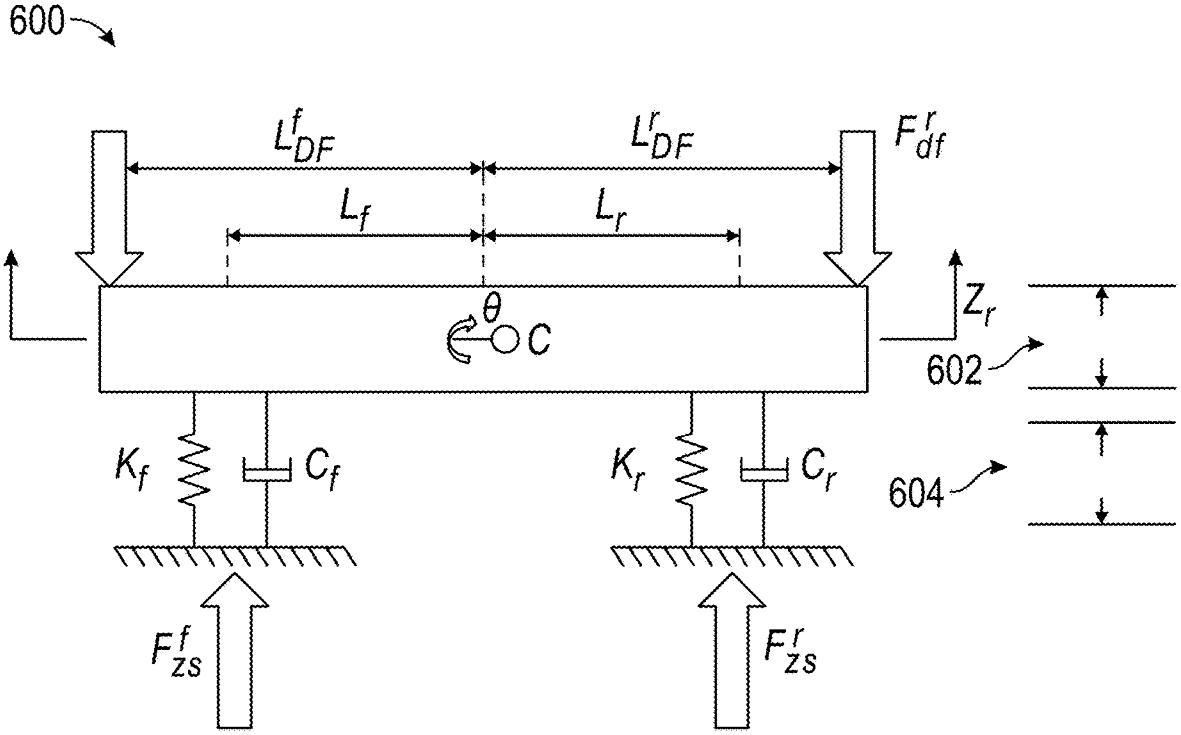
FIG. 6 is a diagram that depicts forces on the vehicle of FIG. 1 according to one or more embodiments.

The linear suspension model 600 is now described in more detail with reference to FIG. 6, which depicts forces on the vehicle 100 according to one or more embodiments with respect to a vehicle portion 602 and a suspension portion 604. In FIG. 6.

$$F_{df}^{f} \text{ and } F_{df}^{r}$$

are front and rear axle downforces respectively, θ and $\dot{\theta}$ are pitch angle and its rate of change respectively, z and $\dot{z}$ are heave and its rate of change respectively, $$F_{zs}^{f} \text{ and } F_{zs}^{r}$$

are the front and rear axle spring forces respectively, and $F_{ctrl,f}$ and $F_{ctrl,r}$ are the recommended active suspension axle forces. The linear suspension model has two degrees of freedom: heave and pitch. The linear suspension model can be expressed by the following equations:

$$M(\ddot{z} + g) = \left(F_{zs}^{f} + F_{Anti\,Dive}\right) + \left(F_{zs}^{r} + F_{Anti\,Squat}\right) - F_{df}^{f} - F_{df}^{r} + F_{ctrl,f} + F_{ctrl,r}$$

$$I_{yy}\ddot{\theta} = L_f\left(F_{zs}^{f} + F_{Anti\,Dive}\right) - L_r\left(F_{zs}^{r} + F_{Anti\,Squat}\right) - L_{DF}^{f}F_{df}^{f} + L_{DF}^{r}F_{df}^{r} - Mh_{pc,cg}a_x + F_{ctrl,f}L_f - F_{ctrl,r}L_r$$

where g is the gravitational constant, z is heave, $L_f$ and $L_r$ are respective distances between a center of gravity C of the vehicle 100 and the front and rear axles of the vehicle 100, m is the total mass of the vehicle 100, M is the momentum of the vehicle 100, and $F_{Anti\ Dive}$ and $F_{Anti\ Squat}$ are the portion of load transfer that is transferred to wheels through anti-dive and anti-squat mechanism. According to one or more embodiments, axle spring forces $$F_{zs}^{f} \text{ and } F_{zs}^{r}$$

are calculated as follows:

$$F_{zs}^{f} = F_{f_0} + K_f z_f + C_f \dot{z}_f$$

$$F_{zs}^{r} = F_{r_0} + K_r z_r + C_r \dot{z}_r.$$

The half-car state-space model $\dot{X}_h$ can be expressed by the following equation:

$$\dot{X}_h = A_h X_h + B_h U_h + D_h$$

The term $X_h$ is a space state vector represented as:

$$X_h = \begin{bmatrix} z \\ \dot{z} \\ \theta \\ \dot{\theta} \end{bmatrix}.$$

The term $U_h$ are inputs represented as:

$$U_h = \begin{bmatrix} F_{ctrl},\ frnt + F_{df},\ frnt \\ F_{ctrl},\ \text{rear} + F_{df},\ \text{rear} \end{bmatrix}$$

Where the inputs include suspension axle forces (e.g., $F_{ctrl}$, frnt and $F_{ctrl}$, rear) and axle downforces (e.g., $F_{df}$, frnt and $F_{df}$, rear).

In an expanded form, the half-car state-space model is expressed as follows:

$$\dot{X}_h = \underbrace{\begin{bmatrix} 0 & 1 & 0 & 0 \\ \frac{K_f + K_r}{M} & \frac{C_f + C_r}{M} & \frac{K_f L_f - K_r L_r}{M} & \frac{C_f L_f - C_r K_r}{M} \\ 0 & 0 & 0 & 1 \\ \frac{K_f L_f - K_r L_r}{I_{yy}} & \frac{C_f L_f - C_r L_r}{I_{yy}} & \frac{K_f L_f^2 + K_r L_r^2}{I_{yy}} & \frac{C_f L_f^2 + C_r L_r^2}{I_{yy}} \end{bmatrix}}_{A_h} X_h +$$

$$\underbrace{\begin{bmatrix} 0 & 0 \\ -1/M & -1/M \\ 0 & 0 \\ \frac{-L_f^{DF}}{I_{yy}} & \frac{L_r^{DF}}{I_{yy}} \end{bmatrix}}_{B_h} U_h + \underbrace{\begin{bmatrix} 0 \\ \frac{F_{f0} + F_{r0} + F_{antidive} + F_{antisquat}}{M} - g \\ 0 \\ \frac{L_f F_{f0} - L_r F_{r0} + L_f F_{antidive} - L_r F_{antisquat} - Mha_x}{I_{yy}} \end{bmatrix}}_{D_h}$$

The non-linear state space model is converted to a linear model using partial derivatives of the state X with respect to the following inputs, which can be calculated analytically using auto differentiation:

$$\frac{\partial X_{k+1}}{\partial X_k},\ \frac{\partial X_{k+1}}{\partial U_k},\ \frac{\partial X_{k+1}}{\partial D_{m,k}}.$$

The resulting converted non-linear state space model is expressed as follows:

$$X_{k+1} = AX_k + BU_k + D_s.$$

A linear state space representation of the neural network model is expressed as follows:

$$\begin{bmatrix} F_{df,frnt}(RH_{frnt}, RH_{rear}) \\ F_{df,rear}(RH_{frnt}, RH_{rear}) \end{bmatrix} =$$

$$\underbrace{\left( \left( B_{NN} \begin{bmatrix} cmd_{frnt} \\ cmd_{rear} \end{bmatrix} - \begin{bmatrix} cmd_{frnt} \\ cmd_{rear} \end{bmatrix}_p \right) + D_{s,NN}[V_x - V_{xp}] + \begin{bmatrix} F_{df,frnt}(RH_{frnt}, RH_{rear}) \\ F_{df,rear}(RH_{frnt}, RH_{rear}) \end{bmatrix}_p - D_{s,NN} \begin{bmatrix} RH_f \\ RH_r \end{bmatrix}_p \right)}_{D_x} + D_{s,NN} \begin{bmatrix} RH_f \\ RH_r \end{bmatrix},$$

where:

$$B_{NN} = \frac{\partial X_{k+1}}{\partial U_k} \Big|_{2\times 2} = W_{31} M_4 W_{21} (I_{10\times 10} - M_5) W_{12}$$

$$D_{s_{NN}} = \frac{\partial X_{k+1}}{\partial D_{m,k}} \Big|_{2\times 3} = W_{31} M_4 W_{21} (I_{10\times 10} - M_5) W_{11}$$

$$M_1^{10\times 1} = \sigma(M_2)$$

-continued $$M_2^{10\times 1} = W_{21} \tanh(M_3) + B_2$$

$$M_3^{10\times 1} = W_{11} D_{m,k} + W_{12} \hat{U}_k + W_{13} \hat{X}_k + B_1$$

$$M_4^{10\times 10} = \text{diag}(\sigma(M_2)) - \text{diag}(\sigma^2(M_2))$$

$$M_5^{10\times 10} = \text{diag}(\tanh^2(M_3))$$

$$\tanh(x) = 2/(1 + \exp(-2x)) - 1$$

$$\sigma(x) = 1/(1 + \exp(-x)).$$

Using the foregoing, an integrated state-space suspension model (e.g., the final suspension prediction model) is generated as follows. The state space model in continuous time domain is converted into discrete time domain as follows:

$$X_h(k+1) = A_{h,d} X_h(k) + B_{h,d} U_h(k) + D_{h,d}$$

$$A_{h,d} = e^{A_h T_s}$$

$$B_{h,d} = A_h^{-1}(A_{h,d} - I) B_h$$

$$D_{h,d} = D_h T_s.$$

This discrete equation can be rewritten as follows:

$$X_h(k+1) = A_{h,d} X_h(k) + B_{h,d} \begin{bmatrix} F_{ctrl},\ frnt \\ F_{ctrl},\ \text{rear} \end{bmatrix} +$$

$$B_{h,d} \begin{bmatrix} F_{df},\ frnt \\ F_{df},\ \text{rear} \end{bmatrix} + D_{h,d} = [B_{h,d} \quad A_{h,d}] \begin{bmatrix} F_{df},\ frnt \\ F_{df},\ \text{rear} \\ X_h(k) \end{bmatrix} + D_{h,d}.$$

New discrete states can be defined as:

$$X_{new} = \begin{bmatrix} F_{df}^f \\ F_{df}^r \\ z \\ \dot{z} \\ \theta \\ \dot{\theta} \end{bmatrix}$$

The state space formulation can be rewritten for the new state by incorporating the state space model for the downforce as follows:

$$\begin{bmatrix} F_{df}^f \\ F_{df}^r \\ z \\ \dot{z} \\ \theta \\ \dot{\theta} \end{bmatrix}_{k+1} = \underbrace{\begin{bmatrix} 0_{2\times 2} & D_{s,NN} \begin{bmatrix} c_1 & 0 & L_f c_1 & 0 \\ c_3 & 0 & -L_r c_3 & 0 \end{bmatrix} \\ B_{h,d} & A_{h,d} \end{bmatrix}}_{A_{new}} \begin{bmatrix} F_{df}^f \\ F_{df}^r \\ z \\ \dot{z} \\ \theta \\ \dot{\theta} \end{bmatrix}_k +$$

$$\underbrace{B_{h,d}}_{B_{new}} \underbrace{\begin{bmatrix} F_{ctrl},\ frnt \\ F_{ctrl},\ \text{rear} \end{bmatrix}}_{U_{new}} + \underbrace{D_{h,d} + D_{s,NN} \begin{bmatrix} c_2 \\ c_4 \end{bmatrix} + D_x}_{D_{new}}$$

Figure 7:
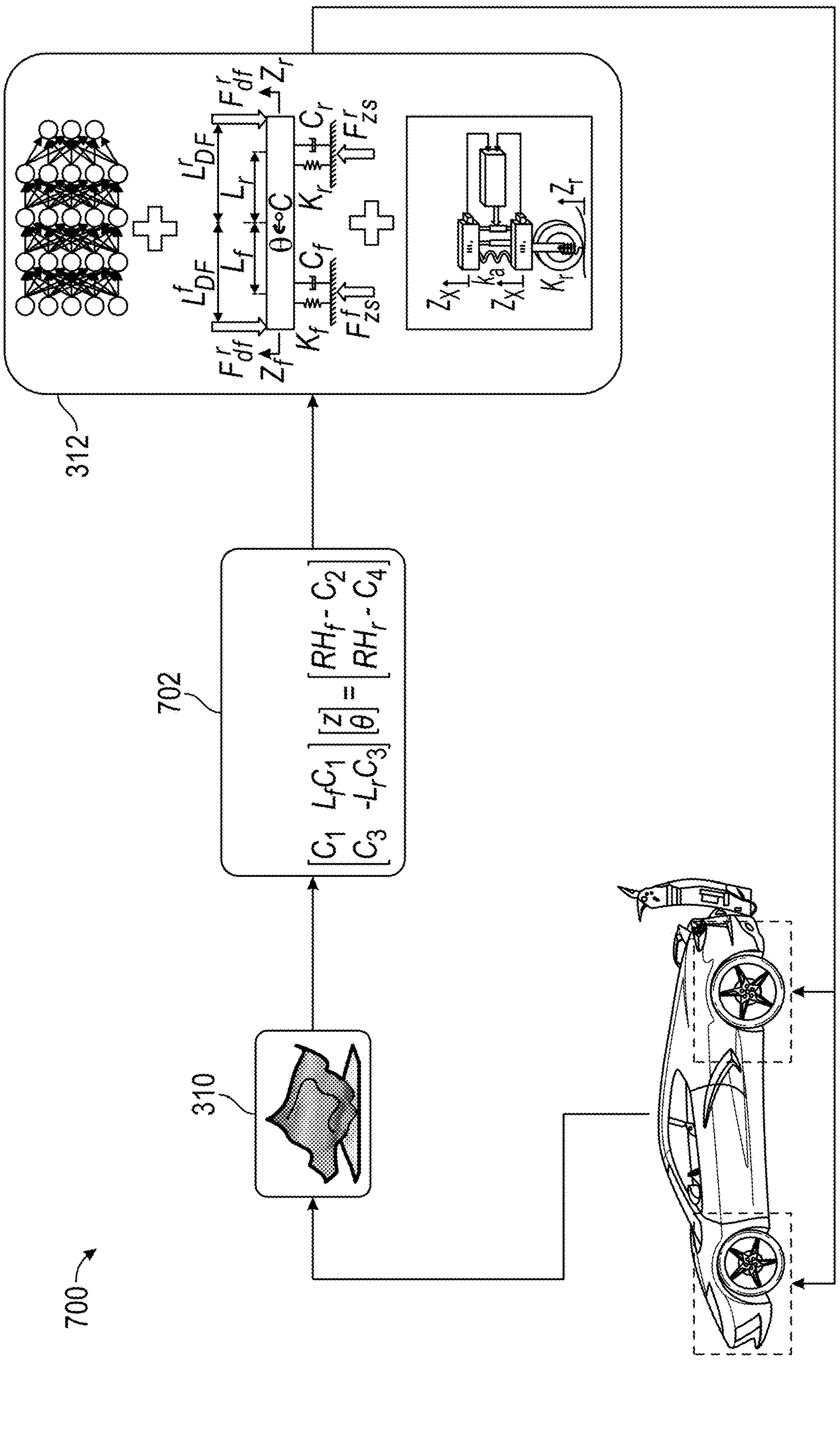
FIG. 7 is an architecture in which the model predictive control engine generates recommended suspension forces for front and rear axles according to one or more embodiments.

With continued reference to FIG. 5, at block 508, the downforce and suspension coordination engine 210 designs the model predictive control engine 312 to obtain the suspension axle forces needed for tracking the optimal ride height. For example, FIG. 7 depicts an architecture 700 in which the model predictive control engine 312 generates recommended suspension forces for front and rear axles. To do this, the vehicle 100 generates an estimation (as described herein), which is fed to the ride height optimizer engine 310. The ride height optimizer engine 310 generates target ride heights. Ride height to pitch and heave conversion can be performed at block 702 to convert the target ride heights to converted target ride. The model predictive control engine 312 receives the converted target ride heights and uses them to generate the suspension forces that are used to cause the active suspension system 106 of the vehicle 100 to control the suspension (e.g., one or more actuators 407) to achieve the optimal ride height for the vehicle 100.

With continued reference to FIG. 5, additional processes also may be included, and it should be understood that the processes depicted in FIG. 5 represent illustrations, and that other processes may be added, or existing processes may be removed, modified, or rearranged without departing from the scope of the present disclosure. It should also be understood that the processes depicted in FIG. 5 may be implemented as programmatic instructions stored on a non-transitory computer-readable storage medium that, when executed by a processor (e.g., the processing device 202 of FIG. 2, the processor(s) 1021 of FIG. 10, and/or the like, including combinations and/or multiples thereof) of a computing system (e.g., the processing system 102 of FIGS. 1 and 2, the processing system 1000 of FIG. 10, and/or the like, including combinations and/or multiples thereof), cause the processor to perform the processes described herein.

Figure 8:
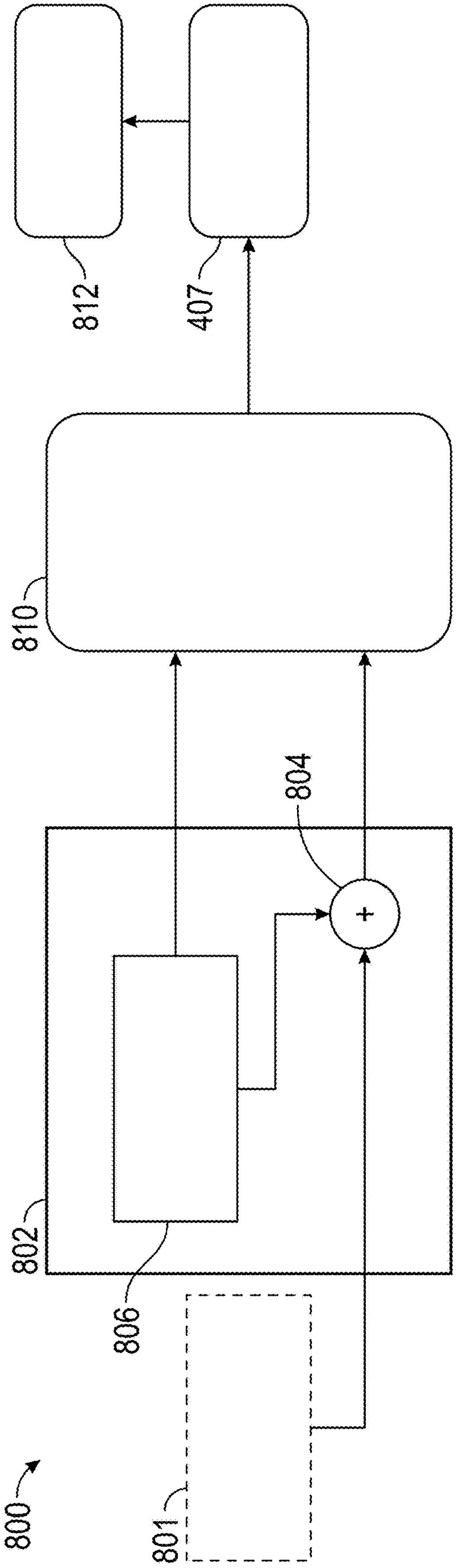
FIG. 8 is an architecture for force handling on active suspension controls according to one or more embodiments.

Turning now to FIG. 8, a block diagram of an architecture 800 for force handling on active suspension controls is depicted according to one or more embodiments. In this example, an operator of the vehicle 100 can select a drive mode (e.g., sport mode, comfort/touring mode, economy mode, and/or the like, including combinations and/or multiples thereof) for operating the vehicle 100. It should be appreciated that the various drive modes have different settings regarding downforce and suspension control. For example, in a sport mode, suspension is commanded to follow the recommended ride height to maximize the downforce and tire grip, sacrificing ride comfort. However, in a comfort/touring mode, the suspension is commanded for maximum ride comfort and downforce is constrained by front and read ride heights, sacrificing performance.

In the example of FIG. 8, a driver command interpreter 802 receives recommended active suspension axle forces 801 from the model predictive control engine 312 as described herein. The driver command interpreter 802 performs force arbitration at block 804 based on the recommended active suspension axle forces from the model predictive control engine 312 and based on a suspension force request from a suspension driver command interpreter 806.

The driver command interpreter 802 sends the driver mode from the suspension driver command interpreter 806 and suspension control forces from the force arbitration block 804 to an integrated suspension supervisory controller 810. The integrated suspension supervisory controller 810 sends corner suspension forces to one or more actuators 407 based on the driver mode and the suspension control forces. The one or more actuators 407 can send suspension actuator commands to hardware controls 812 to implement the desired suspension forces (e.g., the corner suspension forces from the integrated suspension supervisory controller 810).

Figure 9:
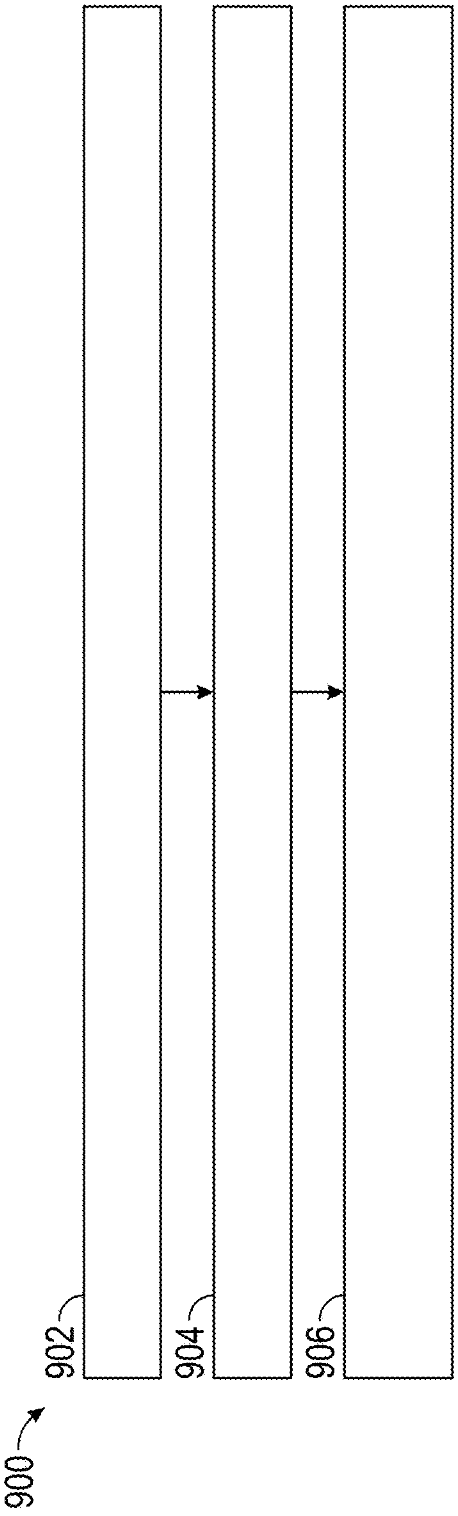
FIG. 9 is a flow diagram of a method for coordination between active downforce and active suspension controls for a vehicle according to one or more embodiments.

FIG. 9 depicts a flow diagram of a method 900 for coordination between active downforce and active suspension controls for a vehicle according to one or more embodiments. The method 900 can be implemented by any suitable system or device, such as the processing system 102 (e.g., using the downforce and suspension coordination engine 210), the processing system 1000 of FIG. 10, and/or the like, including combinations and/or multiples thereof. The method 900 is now described with reference to one or more of FIGS. 1-4 but is not so limited.

At block 902, the downforce and suspension coordination engine 210, using the ride height optimizer engine 310, determines an optimal ride height for the vehicle 100 based on current conditions (e.g., vehicle measurements and/or estimations) of the vehicle as described herein. At block 904, the downforce and suspension coordination engine 210, using the model predictive control engine 312, determines a suspension actuator force to implement the optimal ride height as described herein. At block 906, the active suspension system 106 of the vehicle 100 controls an actuator (e.g., one or more actuators 407) using the suspension actuator force to achieve the optimal ride height for the vehicle 100.

Additional processes also may be included, and it should be understood that the processes depicted in FIG. 9 represent illustrations, and that other processes may be added, or existing processes may be removed, modified, or rearranged without departing from the scope of the present disclosure. It should also be understood that the processes depicted in FIG. 9 may be implemented as programmatic instructions stored on a non-transitory computer-readable storage medium that, when executed by a processor (e.g., the processing device 202 of FIG. 2, the processor(s) 1021 of FIG. 10, and/or the like, including combinations and/or multiples thereof) of a computing system (e.g., the processing system 102 of FIGS. 1 and 2, the processing system 1000 of FIG. 10, and/or the like, including combinations and/or multiples thereof), cause the processor to perform the processes described herein.

Figure 10:
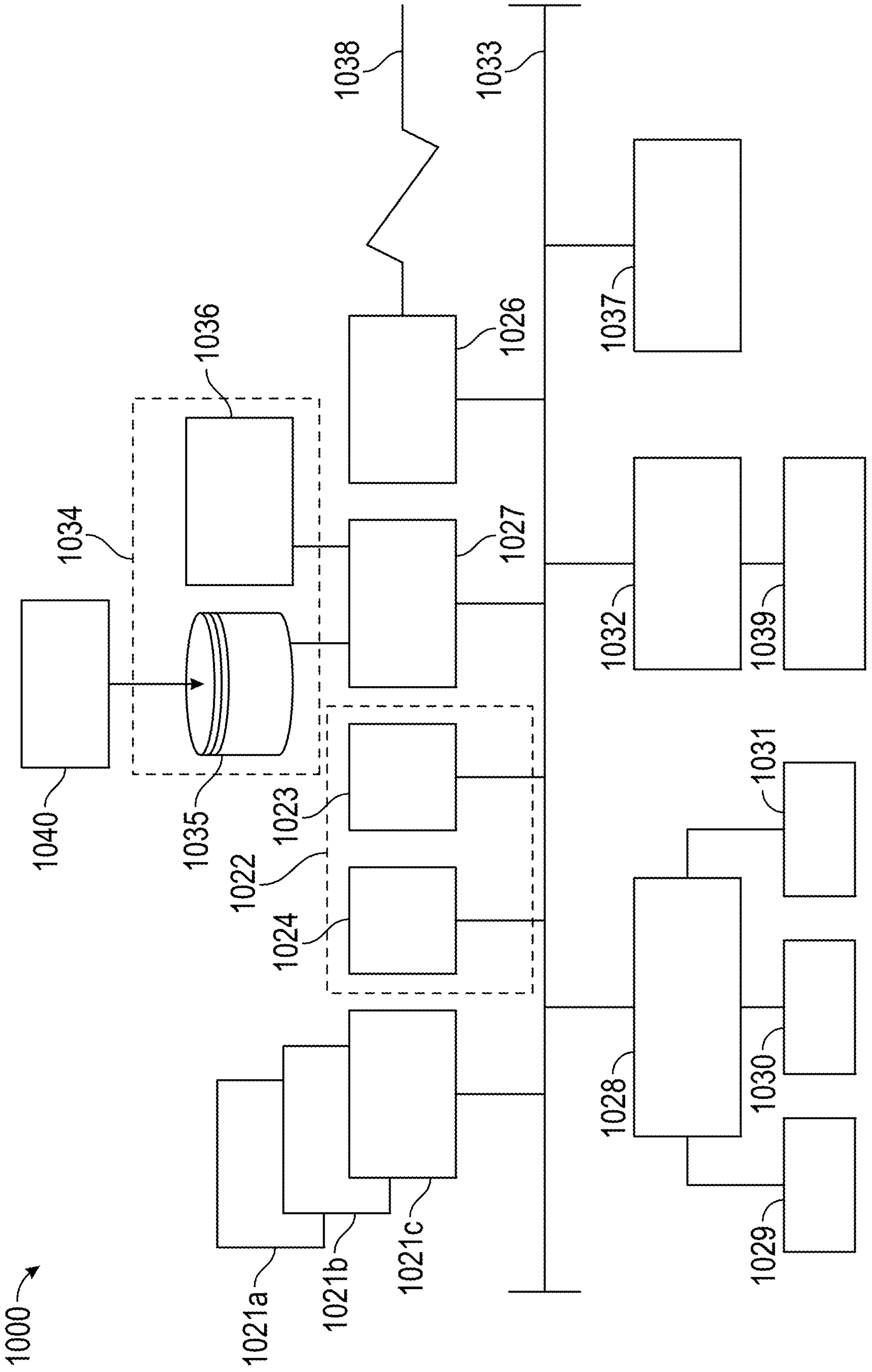
FIG. 10 is a block diagram of a processing system for implementing one or more embodiments described herein.

It is understood that one or more embodiments described herein is capable of being implemented in conjunction with any other type of computing environment now known or later developed. For example, FIG. 10 depicts a block diagram of a processing system 1000 for implementing the techniques described herein. In accordance with one or more embodiments described herein, the processing system 1000 is an example of a cloud computing node of a cloud computing environment. In examples, processing system 1000 has one or more central processing units (referred to also as "processors" or "processing resources" or "processing devices") 1021*a*, 1021*b*, 1021*c*, etc. (collectively or generically referred to as processor(s) 1021 and/or as processing device(s) 1021). In aspects of the present disclosure, each processor 1021 can include a reduced instruction set computer (RISC) microprocessor. Processors 1021 are coupled to a system memory 1022 and/or various other components via a system bus 1033. The system memory 1022 can include one or more temporary and/or persistent memory devices, such as a random access memory (RAM) 1023, a read-only memory (ROM) 1024, and/or the like, including combinations and/or multiples thereof. The system bus 1033 may include a basic input/output system (BIOS), which controls certain basic functions of processing system 1000.

Further depicted are an input/output (I/O) adapter 1027 and a network adapter 1026 coupled to system bus 1033. I/O adapter 1027 may be a small computer system interface (SCSI) adapter that communicates with a hard disk 1035 and/or a storage device 1036 or any other similar component. I/O adapter 1027, hard disk 1035, and storage device 1036 are collectively referred to herein as mass storage

1034. Operating system 1040 for execution on processing system 1000 may be stored in mass storage 1034. The network adapter 1026 interconnects system bus 1033 with an outside network 1038 enabling processing system 1000 to communicate with other such systems.

A display (e.g., a display monitor) 1039 is connected to system bus 1033 by display adapter 1032, which may include a graphics adapter to improve the performance of graphics intensive applications and a video controller. In one aspect of the present disclosure, adapters 1026, 1027, and/or 1032 may be connected to one or more I/O buses that are connected to system bus 1033 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1033 via user interface adapter 1028 and display adapter 1032. A keyboard 1029, mouse 1030, and speaker 1031 may be interconnected to system bus 1033 via user interface adapter 1028, which may include, for example, a Super I/O chip integrating multiple device adapters into a single integrated circuit.

In some aspects of the present disclosure, processing system 1000 includes a graphics processing unit (GPU) 1037. Graphics processing unit 1037 is a specialized electronic circuit designed to manipulate and alter memory to accelerate the creation of images in a frame buffer intended for output to a display. In general, graphics processing unit 1037 is very efficient at manipulating computer graphics and image processing and has a highly parallel structure that makes it more effective than general-purpose CPUs for algorithms where processing of large blocks of data is done in parallel.

Thus, as configured herein, processing system 1000 includes processing capability in the form of processors 1021, storage capability including the system memory 1022 and mass storage 1034, input means such as keyboard 1025 and mouse 1030, and output capability including speaker 1031 and display 1039. In some aspects of the present disclosure, a portion of system memory 1022 and mass storage 1034 collectively store the operating system 1040 to coordinate the functions of the various components shown in processing system 1000.

The terms “a” and “an” do not denote a limitation of quantity, but rather denote the presence of at least one of the referenced item. The term “or” means “and/or” unless clearly indicated otherwise by context. Reference throughout the specification to “an aspect”, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being “on” another element, it can be directly on the other element or intervening elements may also be present. In contrast, when an element is referred to as being “directly on” another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A computer-implemented method for coordination between active downforce and active suspension controls for a vehicle, the method comprising:

determining an optimal ride height for the vehicle based on current conditions of the vehicle, wherein determining the optimal ride height is based at least in part on a specific aerodynamic position of an adjustable aerodynamic surface of the vehicle and a longitudinal velocity of the vehicle;

determining a suspension actuator force to implement the optimal ride height for the vehicle, wherein the suspension actuator force is determined using a model predictive control engine; and controlling, by an active suspension system of the vehicle, an actuator using the suspension actuator force to achieve the optimal ride height for the vehicle.

2. The computer-implemented method of claim 1, wherein the optimal ride height comprises a front ride height of the vehicle and a rear ride height of the vehicle.

3. The computer-implemented method of claim 1, wherein the optimal ride height is determined using a ride height optimizer engine.

4. The computer-implemented method of claim 3, wherein the ride height optimizer engine comprises aerodynamic maps and a neural network.

5. The computer-implemented method of claim 4, wherein the neural network is a shallow fully connected neural network.

6. The computer-implemented method of claim 4, wherein the neural network converts the aerodynamic maps to a non-linear state space model.

7. The computer-implemented method of claim 1, wherein the model predictive control engine comprises an aerodynamic model of the vehicle and a suspension model of a suspension system of the vehicle.

8. The computer-implemented method of claim 1, wherein the model predictive control engine comprises a suspension prediction model generated by converting a nonlinear neural network to a linear suspension model and combining the linear suspension model with a half-car model.

9. A vehicle comprising:

an active downforce system for controlling an adjustable aerodynamic surface of the vehicle;

an active suspension system for controlling an actuator, the actuator adjusting a ride height of the vehicle; and a processing system communicatively coupled to the active downforce system and the active suspension system, the processing system comprising:

a memory comprising computer readable instructions; and a processing device for executing the computer readable instructions, the computer readable instructions controlling the processing device to perform operations for coordination between active downforce and active suspension controls for the vehicle, the operations comprising:

determining an optimal ride height for the vehicle based on current conditions of the vehicle, wherein determining the optimal ride height is based at least in part on a specific aerodynamic position of the adjustable aerodynamic surface of the vehicle and a longitudinal velocity of the vehicle;

determining a suspension actuator force to implement the optimal ride height for the vehicle, wherein the suspension actuator force is determined using a model predictive control engine; and causing the active suspension system of the vehicle to control the actuator using the suspension actuator force to achieve the optimal ride height for the vehicle.

10. The vehicle of claim 9, wherein the optimal ride height comprises a front ride height of the vehicle and a rear ride height of the vehicle.

11. The vehicle of claim 10, wherein the optimal ride height is determined using a ride height optimizer engine.

12. The vehicle of claim 11, wherein the ride height optimizer engine comprises a neural network that converts aerodynamic maps to a non-linear state space model.

13. The vehicle of claim 9, wherein the model predictive control engine comprises an aerodynamic model of the vehicle and a suspension model of a suspension system of the vehicle.

14. A computer program product comprising a computer readable storage medium having program instructions embodied therewith, the program instructions executable by at least one processor to cause the at least one processor to perform operations comprising:

determining an optimal ride height for a vehicle based on current conditions of the vehicle, wherein determining the optimal ride height is based at least in part on a specific aerodynamic position of an adjustable aerodynamic surface of the vehicle and a longitudinal velocity of the vehicle;

determining a suspension actuator force to implement the optimal ride height for the vehicle, wherein the suspension actuator force is determined using a model predictive control engine; and controlling, by an active suspension system of the vehicle, an actuator using the suspension actuator force to achieve the optimal ride height for the vehicle.

15. The computer program product of claim 14, wherein the optimal ride height comprises a front ride height of the vehicle and a rear ride height of the vehicle.

16. The computer program product of claim 15, wherein the optimal ride height is determined using a ride height optimizer engine.

17. The computer program product of claim 16, wherein the ride height optimizer engine comprises a neural network that converts aerodynamic maps to a non-linear state space model.

18. The vehicle of claim 12, wherein the neural network is a shallow fully connected neural network.

19. The vehicle of claim 12, wherein the neural network converts the aerodynamic maps to a non-linear state space model.

20. The computer program product of claim 17, wherein the neural network is a shallow fully connected neural network, and wherein the neural network converts the aerodynamic maps to a non-linear state space model.

* * * * *